July 4, 1950     M. W. GREDELL     2,514,051

SHOCK ABSORBENT COUPLING

Filed Aug. 9, 1947

INVENTOR.
MARCELLUS W. GREDELL

BY *Edward M. Apple*

ATTORNEY

Patented July 4, 1950

2,514,051

UNITED STATES PATENT OFFICE 2,514,051

SHOCK ABSORBENT COUPLING

Marcellus W. Gredell, Detroit, Mich.

Application August 9, 1947, Serial No. 767,811

1 Claim. (Cl. 64—30)

This invention relates to mechanical power transmissions, and has particular reference to a coupling to be used between a power unit, such as an engine, or motor, and any driven unit, such as a marine propeller, lawn mower, sickle bar, or the like.

An object of the invention is the provision of a coupling which is adapted to absorb all shock which may result from sudden engine failure, or from the jamming of the driven unit such as the striking of a rock or log by a propeller in a marine installation.

Another object of the invention is the provision of a coupling which is suitable for installation between the engine and the cutting blades of a lawn mower to prevent the breaking of drive chains, sprocket pins, and the like caused by the cutter blades striking rocks or other debris.

A further object of the invention is the provision of a coupling for use in any mechanical power transmission which is constructed and arranged whereby the parts may slip when overloaded, thereby obviating the possibility of shearing keys, pins, and the like.

A further object of the invention is to provide a coupling which is economical to manufacture, simple in construction, and easy to install and disassemble.

The foregoing and other objects and advantages of the invention will become more apparent as the description proceeds, reference being made from time to time to the accompanying drawings, forming part of the within disclosure, in which drawings.

Figure 1:
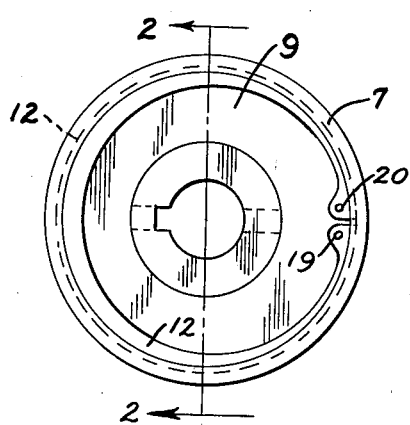
Fig. 1 is a side elevational view of a device embodying the invention.

Referring now more particularly to the drawings, it will be understood that in the embodiment herein disclosed (Figs. 1 and 2) my coupling consists generally of an outer ring 7, left and right flanges 8 and 9, a flexible ring 10 which is preferably made of rubber, or other suitable compressible material, and split locking rings 11 and 12, all of which are formed and held in the assembly as hereinafter described.

The flanges 8 and 9 are provided with central bores 8A and 9A to accommodate the respective ends of the drive shaft 13 and driven shaft 14. Each of the bores 8A and 9A is provided with a key way 8B and 9B, and each flange is transversely bored, as at 8C and 9C, to accommodate the pins 15 and 16.

Figure 2:
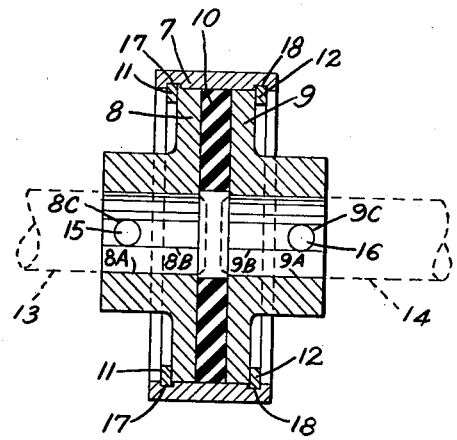
Fig. 2 is a section taken on the line 2—2 of Fig. 1.
Figure 3:
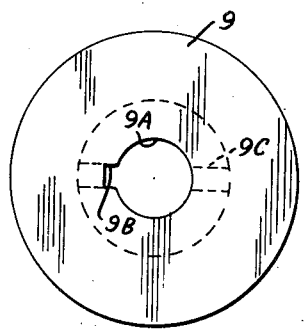
Fig. 3 is a plan view of one of the flanges employed in the construction of the device shown in Figs. 1 and 2.
Figure 4:
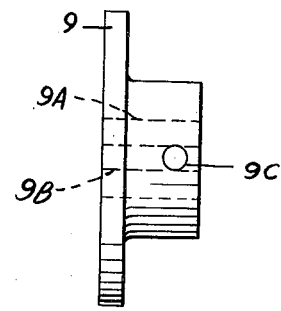
Fig. 4 is a side elevational view of the flange shown in Fig. 3.
Figure 5:
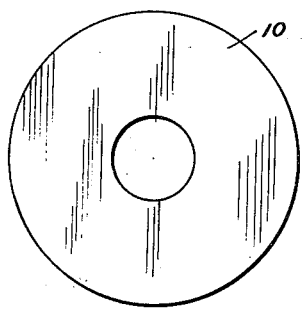
Fig. 5 is a plan view of the flexible ring employed in the construction illustrated in Fig. 2.
Figure 6:
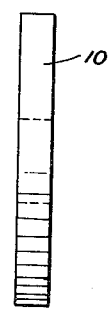
Fig. 6 is a side elevational view of the flexible ring shown in Fig. 5.

The outer ring 7 has a pair of grooves 17 and 18 formed on the inner periphery, which grooves are adapted to accommodate the split locking rings 11 and 12. The split rings 11 and 12 taper toward the ends, as shown in Fig. 1, and are provided at their ends with ears 19, each of which is provided with an opening 20 to accommodate a tool for contracting the rings during the installation and removal thereof.

The device may be assembled from either side, that is either the flange 8 or the flange 9 may be secured in position first. The rubber ring 10 is then inserted, and the opposite flange is pressed into place and secured by its locking ring.

It will be noted that the outer ring 7, the flexible ring 10, and the flanges 8 and 9 are all full floating with respect to one another. The amount of foot pounds of torque which may be transmitted through this coupling is governed by the pressure and co-efficient of friction between the flanges 8 and 9 and the flexible ring 10.

Having described my invention, what I claim and desire to secure by Letters Patent is:

In a device of the character described, including a pair of flanges having a compressible washer positioned therebetween, the combination of a cylindrical member positioned about the outer periphery of said flanges and said washer, slots formed on the inner periphery of said cylindrical member, and split rings in said slots arranged to contact the outer faces of said flanges.

MARCELLUS W. GREDELL.

REFERENCES CITED

The following references are of record in the file of this patent:

UNITED STATES PATENTS

| Number | Name | Date |
|---|---|---|
| 1,756,689 | Jenkins | Apr. 29, 1930 |
| 2,140,255 | Rieske | Dec. 13, 1938 |
| 2,290,421 | Fitzgerald | July 21, 1942 |
| 2,360,149 | Moser | Oct. 10, 1944 |